United States Patent [19]

Dubuit et al.

[11] Patent Number: 4,667,804
[45] Date of Patent: May 26, 1987

[54] TRANSFER APPARATUS FOR CONVEYING WORK HOLDER SUPPORTS ALONG A CLOSED PATHWAY

[75] Inventors: Jean-Louis Dubuit, Paris; Eric Rouly, Saint-Maur, both of France

[73] Assignee: Societe d'Exploitation des Machines Dubuit, Paris, France

[21] Appl. No.: 556,603

[22] Filed: Nov. 30, 1983

[30] Foreign Application Priority Data

Dec. 1, 1982 [FR] France .................. 82 20137

[51] Int. Cl.⁴ .................................................. B65G 47/00
[52] U.S. Cl. ................................... 198/345; 198/465.1
[58] Field of Search .............. 198/345, 472, 645, 339, 198/380, 341, 339.1, 465.1, 346.1, 803.01, 343

[56] References Cited

U.S. PATENT DOCUMENTS

| | | | |
|---|---|---|---|
| 2,277,309 | 3/1942 | Doll | 198/19 |
| 2,789,683 | 4/1957 | Stahl | 198/110 |
| 3,204,756 | 9/1965 | Lesch | 198/803.1 |
| 3,315,778 | 4/1967 | Kendall, Sr. et al. | 198/580 |
| 3,384,097 | 5/1968 | Meeker et al. | 198/339 |
| 3,934,700 | 1/1976 | Schubert et al. | 198/19 |
| 4,040,533 | 8/1977 | De Boer et al. | 198/472 |
| 4,492,297 | 1/1985 | Sticht | 198/465.1 |
| 4,503,964 | 3/1985 | Kampf et al. | 198/341 |

FOREIGN PATENT DOCUMENTS

| | | |
|---|---|---|
| 0022095 | 1/1981 | European Pat. Off. . |
| 1212181 | 3/1960 | France . |
| 1353630 | 1/1964 | France . |
| 2116222 | 7/1972 | France . |
| 2158078 | 6/1973 | France . |
| 2257387 | 8/1975 | France . |
| 742473 | 12/1955 | United Kingdom . |
| 744297 | 2/1956 | United Kingdom . |
| 873033 | 7/1961 | United Kingdom . |
| 1157693 | 7/1969 | United Kingdom . |
| 1371059 | 10/1974 | United Kingdom . |
| 1412458 | 11/1975 | United Kingdom . |
| 1470240 | 4/1977 | United Kingdom . |
| 2025347 | 1/1980 | United Kingdom . |
| 2023524 | 1/1980 | United Kingdom . |
| 2040244 | 8/1980 | United Kingdom . |
| 2059375 | 4/1981 | United Kingdom . |

Primary Examiner—Joseph E. Valenza
Attorney, Agent, or Firm—Charles E. Brown; Charles A. Brown

[57] ABSTRACT

A transfer apparatus conveys work holder supports along a closed pathway, defined by a fixed guideway, passing by at least one work station. A first, drive conveyor which is preferably an endless conveyor and operates continuously transports the work holder supports along a first segment of the closed pathway and a second, pickup conveyor which in practice operates intermittently transports the work holder supports along a second segment passing by the work station or stations. The path of the first conveyor has a section which is detoured away from the work station or stations. The work holder supports are releasable engageable with the dogs on the first conveyor and projecting pins on cranks of the second conveyor for coupling and uncoupling the work holder supports upstream and downstream of the work station or stations. The second, pickup conveyor comprises for each work station two cranks having projecting pins selectively engageable with a corresponding groove in each work holder support for selectively coupling it for displacement.

16 Claims, 14 Drawing Figures

TRANSFER APPARATUS FOR CONVEYING WORK HOLDER SUPPORTS ALONG A CLOSED PATHWAY

The present invention relates generally to handling and transferring articles such as bottles, and more particularly, though not exclusively, to transferring and handling such articles for printing.

In known printing machines for such articles there are a plurality of work stations. First of all, there are one or more printing stations depending on the number of colors to be printed. Ahead of the printing station or stations there are optionally a registration station and even a preregistration station and after the printing station or stations there is a drying or oven-drying station. These work stations are necessarily spaced from each other. It is therefore necessary to advance the articles from one station to another, stopping them at each one of the stations.

Usually the circuitous movement of the articles is provided by an endless drive conveyor which runs over direction change means of which at least one is a driven direction change means. The endless conveyor carries spaced work holder supports each for holding one of the articles. Such work holder supports may be mere cradles which the articles bear simply by gravity. However, for at least some applications, it is desirable for the work holder supports to have means for grasping and positively holding the articles. Such work holders are therefore heavier than mere cradles.

Accordingly, the overall weight transported by drive conveyor is markedly increased, and this is accentuated if the number of work stations is relatively high—since the drive conveyor will be relatively long and therefore have a relatively large number of work holders—and if the articles themselves are particularly heavy, which is the case when handling articles of glassware.

The inertia of such a heavy load to be transported inevitably leads to limiting the working speed. Further, there is an apparent lack of compatibility between the pauses or stopping of the articles at the work stations and the preferably continuous circuitous movement of the articles upstream and downstream of the work stations.

An object of the present invention is to provide an article transferring apparatus which enables the foregoing drawbacks to be overcome.

According to a first aspect of the invention there is provided a transfer apparatus for conveying work holder supports along a closed pathway passing by at least one work station. The transfer apparatus has a fixed guideway defining the closed pathway. The work holder supports are individually mounted for movement on the fixed guideway. A first, so-called drive conveyor transports the work holder supports along a first segment of the closed pathway, and a second, so-called pickup conveyor takes over from the first, drive conveyor for transporting the work holder supports over a second segment of the closed pathway passing by the at least one work station. Releasable engagement means couple the work holder supports to the first, drive conveyor and release the work holders from the first, drive conveyor upstream of second segment of the closed pathway and couple the work holder supports to the first, drive conveyor downstream of second segment of the closed pathway.

For example, where the first conveyor is an endless conveyor running over two or more change direction means of which at least one is driven, the first conveyor veers away from the at least one work station for freeing the work holder supports and subsequently the work holder supports are picked up by the second conveyor.

Owing to this arrangement the advance of the work holder supports from one work station to another which is provided by the second conveyor is effectively separated from the recycling or return of the work holder supports to the entrance of the transfer apparatus which is performed by the first conveyor.

The apparent incompatibility between the stopping or pause of the work holder supports at the work stations and the continuous displacement of the work holder supports between the work stations is thus overcome. Although the first and second conveyors are controlled synchronously, the first conveyor may advantageously advance continuously whereas the second conveyor advances intermittently or stepwise.

Further, as these functions are separate and distinct from each other although they are controlled in synchronism, the first and second conveyors may have different working speeds.

In practice the working speed of the second conveyor may be adapted to the advance of the work holder supports by the work stations whereas the working speed of the first, drive conveyor may be sufficiently high to provide quick return of the work holder supports to the entrance of the apparatus. Owing to the high-speed return of the first, drive conveyor independently of the second, pickup conveyor, the overall speed of the work holder supports may be relatively high.

Accordingly, the number of work holder supports carried by the first conveyor may be correspondingly reduced. This in turn reduces the weight carried and the inertia of the first, drive conveyor.

This is all the greater since in practice the first, drive conveyor drives the work holder supports along only one of its runs, and along the other run it carries only the component of the releasable engagement means between each of the work holder supports and the first, drive conveyor.

The releasable engagement means preferably comprise a so-called drive groove in each of the work holder supports and a plurality of spaced-apart dogs protruding from the first, drive conveyor selectively engageable with the drive grooves.

Preferably, adjacent portions of the first, drive conveyor and the second, pickup conveyor are spaced from each other along the closed pathway defined by the fixed guideway. Preferably, nondriven segments are provided between the first and second segments of the closed pathway, the work holder supports being adapted to push one another along the non-driven segments between adjacent portions of the first and second segments of the closed pathway.

Preferably, releasable engagement means are provided for the work holder supports on the second, pickup conveyor, the work holder supports released by one of the first and second conveyors being adapted to push one another toward the other of the first and second conveyors.

According to an important preferred feature the second, pickup conveyor comprises at least one rotatable crank having a projecting pin selectively engageable with a so-called pickup groove in each of the work holder supports for selectively coupling the work holder supports to the or each crank for displacement thereby.

According to a second aspect of the invention a transfer apparatus is provided for conveying work holder supports along a closed pathway passing by at least one work station. The transfer apparatus has a fixed guideway defining the closed pathway. The work holder supports are individually mounted for movement on the fixed guideway. A so-called pickup conveyor transports the work holder supports along at least part of the closed pathway. The pickup conveyor comprises at least one rotatable crank having a projecting pin selectively engageable with a so-called pickup groove in each of the work holder supports for coupling the work holder supports to the crank for displacement.

Preferably, two such cranks are provided at the or each work station, spaced along the fixed guideway and rotatable synchronously, the two cranks at the or each work station being engageable in succession with each of the work holder supports.

The construction of the second, pickup conveyor with such cranks is particularly simple and economical, since it does not require the use of any kind of chain or other conventional drive means.

Indeed, the cranks are imparted simple rotating movement, they are capable of good working speeds, and owing to their rotational movement they provide a very flexible stepwise advance satisfactory for the work holder supports they displace. In practice the spacing of the work holder supports transported by the second, pickup conveyor is different from the spacing of the work holder supports immediately upstream of the second segment of the closed pathway. Preferably, the spacing of the work holder supports immediately upstream of the second segment of the closed pathway is a minimum spacing equal to the width of one such work holder support. Indeed, once the work holder supports are freed from the first, drive conveyor, they are advanced by pushing against one another.

Preferably, the spacing of the work holder supports transported by the first, drive conveyor is different from the spacing of the work holder supports transported by the second, pickup conveyor or the spacing of the work holder supports immediately upstream of the second segment of the closed pathway.

Despite the lack of connection between the first, drive conveyor and the second, pickup conveyor there is no dead time for the transfer apparatus. Accordingly, the overall work speed of the transfer apparatus is relatively high.

To be sure in U.S. Pat. No. 3,934,700 two cooperating conveyors are disclosed, one of the conveyors (the pickup conveyor) transporting the work holder supports past a work station whereas the other or drive conveyor forms an endless loop which veers away from the work station and picks up the work holder support downstream of the work station returning them to a location upstream of the work station.

Slideways are associated with the two conveyors in U.S. Pat. No. 3,934,700 for guiding the work holder supports but these slideways do not form a fixed, closed, endless guideway as defined by the present invention but a plurality of guideway segments. Further, the slideways for each of the conveyors lie in different planes therefore requiring interconnecting means which comprises transfer stations including lifting devices or elevators which are relatively complex and the operation of which involves stopping the other or drive conveyor momentarily.

These and other features and advantages of the invention will be brought out in the description which follows, given by way of example, with reference to the accompanying diagrammatic drawings.

The drawings are diagrammatic. Only these parts necessary for understanding the invention are represented or simply suggested in drawings.

Figure 1:
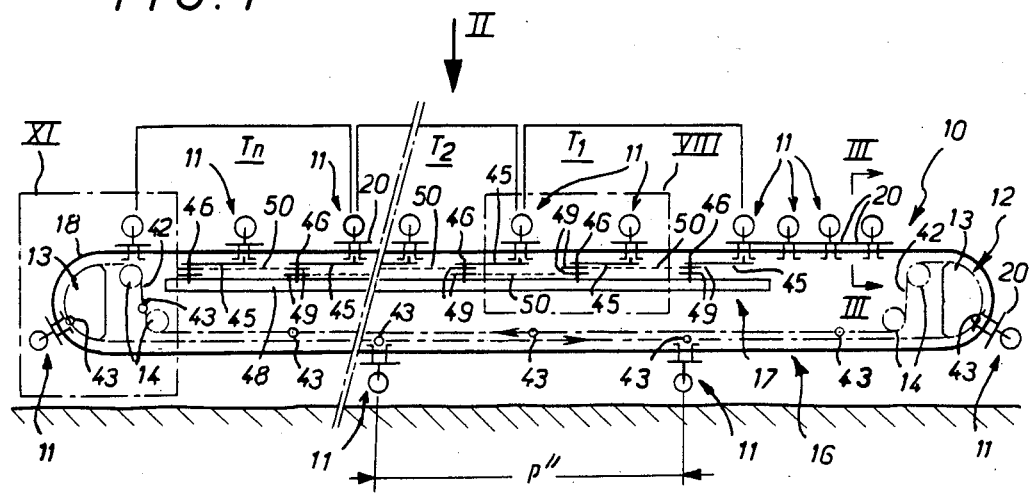
FIG. 1 is a partial elevational view of a machine equipped with a transfer apparatus according to the invention.
Figure 2:
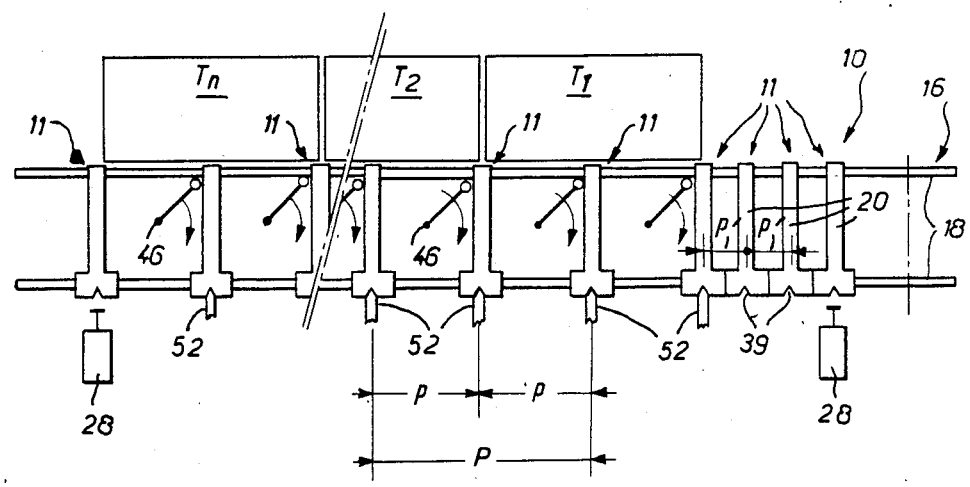
FIG. 2 is a partial plan view of the machine viewed in the direction of arrow II in FIG. 1.

The details of the construction of the apparatus are within the purview of those ordinarily skilled in the art except where described in full. Thus, for example, the frame of the apparatus has not been illustrated in FIGS. 1 and 2. Moreover, the present invention is not directed to the actual printing machine.

Suffice it to say that the printing machine embodying the transfer apparatus comprises a plurality of work stations T1, T2 . . . Tn in alignment with one another. These work stations may, for example, be printing stations. For the sake of simplicity it will be assumed that the work stations T1, T2 . . . Tn are uniformly spaced from one another.

The transfer apparatus 10 is adapted to circuitously displace work holder supports 11 successively by each one of the work stations T1, T2 . . . Tn. The frame of the transfer apparatus 10 is not illustrated in the drawings and, as mentioned above, will not be described in detail herein. The frame may be a separate frame or part of the frame of the associated printing machine.

The transfer apparatus 10 comprises, as known per se, a first or so-called, drive conveyor 12. As illustrated the first, drive conveyor 12 is an endless conveyor which is run around direction change means 13, 14, described in detail below, of which at least one is driven.

All the work or article holder supports 11 are individually movably mounted on a fixed closed, endless guideway 16 defining a closed pathway, releasable engagement means are provided between the work holder supports 11 and the first, drive conveyor 12 for transporting the work holder supports along a first segment of the closed pathway.

A second or so-called pickup conveyor 17 which is separate from the drive conveyor 12, takes the place of the first, drive conveyor for transporting the work holder supports 11 over a second segment of the closed pathway by the work stations T1, T2 ... Tn. To this end the path of the drive conveyor 12 veers away from the second segment of the closed pathway and therefore from the work stations T1, T2 ... Tn and frees the work holder supports.

In practice the fixed guideway 16 comprises two parallel guide rails 18 each formed by a suitably shaped flat bar. The top and bottom runs of the fixed guideway 16 are generally parallel to each other along their entire length. The ends of the guide rails of the top and bottom runs are joined to each other by preferably semicircular portions.

In the illustrated embodiment the drive conveyor 12, described in detail below, forms a closed, endless loop.

The work holder supports 11 are oriented crosswise of the guide rails 18 of the fixed guideway 16 from one guide rail to the other, and bear against the guide rails by rollers at each of their ends.

As diagrammatically illustrated in FIGS. 3-7, each of the work holder supports 11 comprises a plate member 20 of generally T-shape in plan view and means 21 for grasping and positively holding an article to be transported or transferred.

Figure 3:
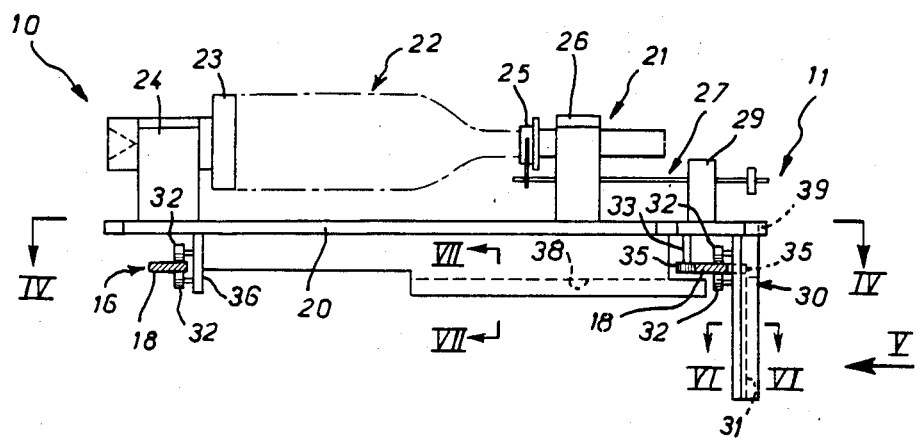
FIG. 3 is larger scale cross-sectional view of the transfer apparatus, illustrating a work holder support, taken along line III—III in FIG. 1.
Figure 4:
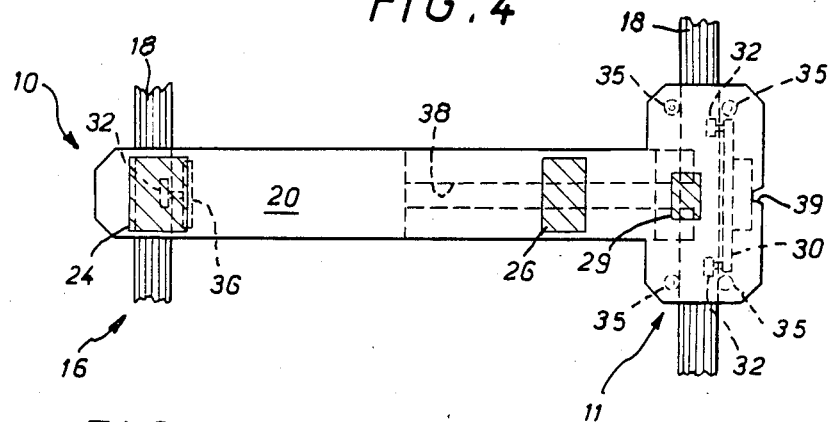
FIG. 4 is a sectional view taken along line IV—IV in FIG. 3.
Figure 5:
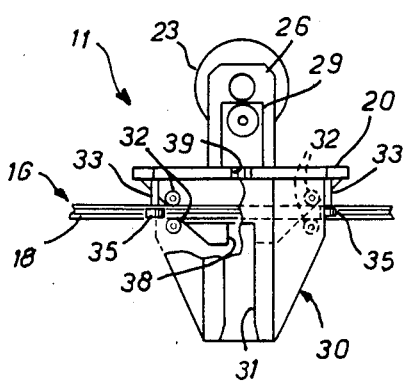
FIG. 5 is an elevational view taken in the direction of arrow V in FIG. 3 with parts broken away.
Figure 6:
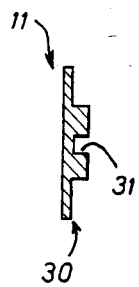
FIGS. 6 and 7 are fragmentary sectional views of the work holder support, taken respectively along lines VI—VI and VII—VII in FIG. 3.
Figure 7:
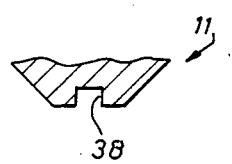
Figure 8:
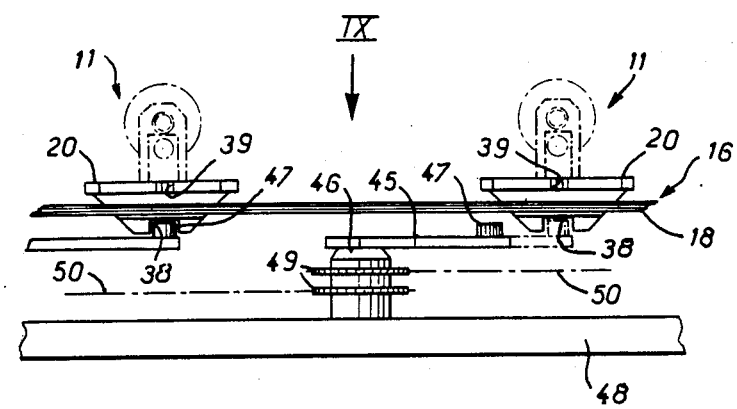
FIG. 8 is another larger scale view of the part of FIG. 1 enclosed in dotted line box VIII in FIG. 1.

If the article is a bottle 22 as represented in phantom line in FIG. 3, the means 21 for grasping and holding comprises, as in known per se, a base or dummy base 23 which is rotatably mounted on a support 24 carried by the plate member 20 and adapted to bear against the bottom of such a bottle, and spaced from the base or dummy base 23, a mandrel or center 25 which is rotatably mounted on a support 26 carried by the plate member 20 and is adapted to bear against the neck of the bottle. Such arrangements are known per se and are described notably in French Pat. No. 1,353,630.

According to arrangements similar to those also disclosed in French Pat. No. 1,353,630, which, however, are applied to the dummy base 23, the mandrel 25 is axially retractable by control means 28. upstream and downstream of the second segment of the closed pathway and therefore of work stations T1, T2 ... Tn, first of all for positioning or loading the bottle 22 to be transferred, then for removing or unloading after transfer. In practice the control means 27 is carried by a support 29 fixed to the plate member 20.

According to similar arrangement to those disclosed in French Pat. No. 1,353,630, at each or all of the work stations T1, T2 ... Tn, the dummy base 23 is adapted to be controlled through a dog clutch by the control means 27, not shown in FIG. 2, and in general belonging to the work stations T1, T2 ... Tn concerned. The control means 27 provides rotation about its axis for rotating a bottle 22, which may be necessary during the printing or other related treatment thereof.

At the front of the plate member 20, adjacent the mandrel 25 in the illustrated embodiment, the plate member 20 supports a flange 30 projecting from its lower side. On its outer side, flange 30 has a groove 31 which will be referred to as the drive groove. In practice the drive groove extends substantially perpendicularly to the plate member 20 and opens to the lower end of the flange 30, preferably with a slightly flared portion as illustrated.

Four rollers 32 are rotatably mounted on the inner side of the flange 30 in a rectangular array. Two of the rollers 32 bear against the upper side of the corresponding guide rail 18 of the fixed guideway 16, spaced from each other, and the other two rollers 32 bear against the lower side of the guide rail 18 also spaced from each other.

Similarly, at the rear of the plate member 20, and therefore adjacent the dummy base 23 side in the illustrated embodiment, the plate member 20 supports a flange 36 projecting from its lower side. Two rollers 32 are spaced apart and rotatably mounted, one of the rollers bears against the upper side of the corresponding guide rail of the fixed guideway 16 and the other bears against the lower side thereof.

The work holder supports 11 therefore bear against and are so to speak clamped to the guide rails 16 of fixed guideway 18 through rollers 32.

The work holder supports 11 may roll along the upper side of the fixed guideway 16 or be suspended from the lower side thereof. In other words each work holder support 11 is in engagement with the fixed guideway by bearing against the upper and lower sides thereof. In conjunction therewith the rollers 35 position the work holder supports 11 crosswise with respect to the guideway 16.

On the underside of the plate member 21 there is provided another groove 38 which will be referred to as the pickup groove.

Finally, at its front end, and for reasons which will become apparent below, the plate member 20 has a trapezoidal notch in its median zone.

Figure 11:
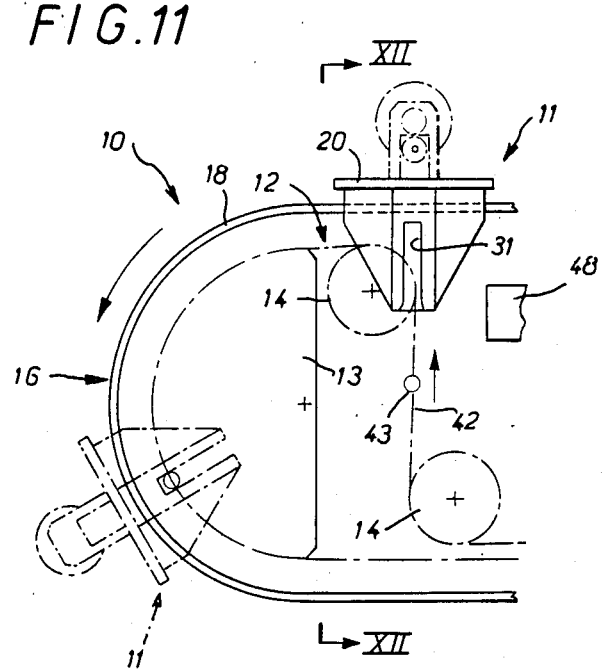
FIG. 11 is a larger scale view of the part enclosed in box XI in FIG. 1.
Figure 12:
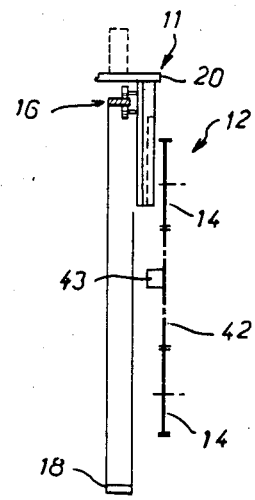
FIG. 12 is a corresponding cross-sectional view taken along line XII—XII in FIG. 11.

As diagrammatically illustrated in FIGS. 11 and 12 the first, drive conveyor 12 comprises a chain which runs slightly to the front of the apparatus. The direction change means 13 over which the endless chain runs are for example of fixed semicircular contour, concentric with the curved portions of the fixed guideway 16 and inwardly thereof.

The other direction change means 14 over which the chain runs are, on the other hand, rotatable members, in practice sprockets, and they act only on the upper run of the chain turning the pathway of the chain of the first, drive conveyor away from the work stations T1, T2 ... Tn.

Thus two direction change means 14 are provided ahead or upstream of the second segment of the closed pathway and therefore of the work stations and two direction change means 14 are provided after or downstream of the second segment of the closed pathway and therefore of the work stations.

The first, drive conveyor has a section 42 immediately upstream and another section 42 immediately downstream of the second segment of the closed pathway and therefore of the work stations T1, T2 ... Tn which extend generally transversely with respect to the upper run of the fixed guideway 16 and therefore extend substantially perpendicularly to the guide rails 18.

In conjunction therewith releasable engagement means are provided between each of the work holder supports 11 and the first, drive conveyor 12 and comprise for each of the work holder supports 11 the drive groove 12, a plurality of dogs 43 projecting at spaced locations along and in practice inwardly of the first, drive conveyor 12. Each of the dogs 43 is adapted to engage or disengage one of the drive grooves.

Indeed, when, for example, as illustrated in FIG. 11, a work holder support 11 reaches a position along the top run of the fixed guideway 16 downstream of the second segment of the closed pathway, and therefore of the work stations T1, T2 ... Tn, the drive groove 31 of the work holder support 11 extends generally parallel to the corresponding transverse section 42 of the first, drive conveyor 12 and in alignment therewith since the transverse section 42 is substantially perpendicular to the top run of the fixed guideway 16. Thereupon a dog 43 carried by the first, drive conveyor 12 may, in motion, freely engage the drive groove 31 for coupling the work holder support 11 concerned. The engagement in the drive groove 31 is of course facilitated by the flared lower portion through which the dog 43 enters the drive groove 31.

Likewise, when a work holder support 11 coupled to the first, drive conveyor 12 reaches a position upstream of the second segment of the closed pathway and therefore of the work stations T1, T2 ... Tn, in line with the transverse section 42 thereof, the dog 43 which up to then engaged the drive groove 31 automatically disengages the drive groove 31 thereby dropping off or freeing the work holder support 11 from the first, drive conveyor 12.

The work holder supports 11 bunch up against one another and are then picked up one at a time by the second, pickup conveyor 17.

For each work stations T1, T2 ... Tn the pickup conveyor 17 has at least one crank 45 rotatably mounted on a shaft 46 substantially perpendicular to the upper side of the fixed guideway 16 and having an upwardly protruding pin 47 which is adapted to engage the pickup groove 38 in the work holder support 11. The drive shaft 46 is carried on a longitudinal support member 48 common to all the work stations T1, T2 ... Tn.

In practice, as shown in the drawings, the second, pickup conveyor 17 comprises two cranks 45 for each of the work stations T1, T2 ... Tn which are spaced along the fixed guideway 16 and are adapted to intervene one after another on each work holder support 11 to advance the same one step or increment p equal to one half the spacing P of two work stations T1, T2 ... Tn. The two cranks 45 associated with a work station T1, T2 ... Tn have in practice the same angular orientation on their respective drive shafts 46.

The entire apparatus is of course controlled synchronously, sprocket 49 and chain 50 transmissions are connected between drive shafts 46 along all the work stations T1, T2 ... Tn.

Preferably, indexing means are also associated with each of the work stations T1, T2 ... Tn for permitting the position of the work holder supports 11 to be positively determined with respect to each of pauses and facilitate the engagement of their pickup grooves 38 with the pin 47 of the corresponding crank 45.

Figure 9:
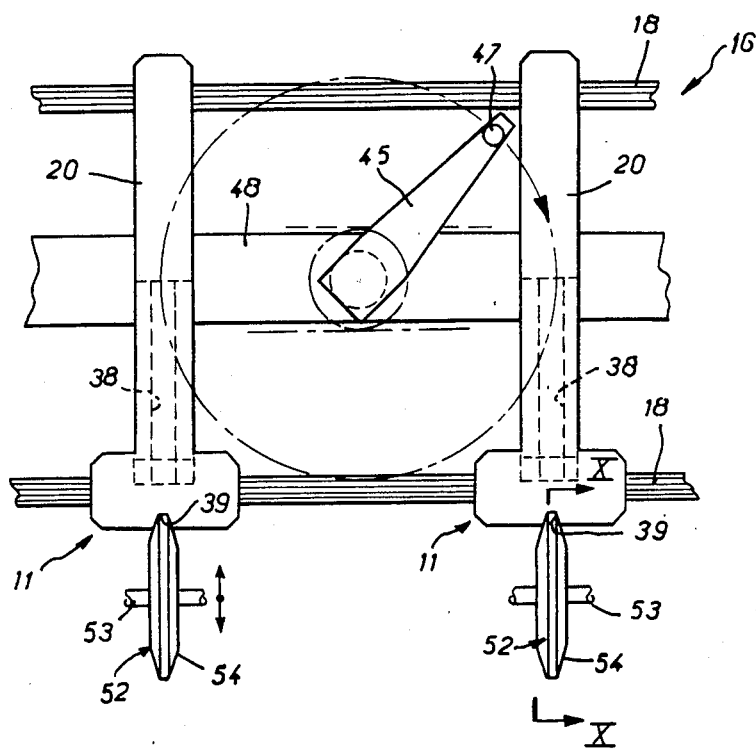
FIG. 9 is a partial plan view of the part in FIG. 8, taken in the direction of arrow IX.
Figure 10:
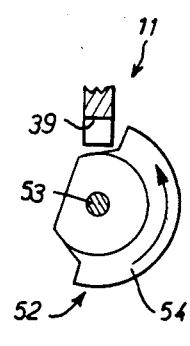
FIG. 10 is a partial cross-sectional view, on a different scale, taken along line X—X in FIG. 9.

As illustrated in FIGS. 9 and 10 the indexing means comprises for each pause or dwell position of a work holder support 11 along the top run of the fixed guideway 16, a disc 52 keyed for rotation on a rotary shaft 53. The trapezoidal peripheral sector 54 of the disc 52 which is complementary to that of the notch 39 in plate member 20 of each work holder support 11 is provided only along a semicircumferential portion of the disc 52, see FIG. 10. When the trapezoidal peripheral sector 54 is in engagement with such a notch 39, the work holder support 11 is immobilized with respect to the fixed guideway 16. On the other hand when the peripheral sector 54 is free of the notch 39 the work holder support 11 can continue its advance.

Shaft 53 which is controlled synchronously with the first, drive conveyor 12 and the second, pickup conveyor 17 may be common to all the discs 52 employed. Likewise such discs may be provided upstream and downstream of the work stations T1, T2 ... Tn along the transverse sections 42 of the drive conveyor 12 together with the control means 28 for loading and unloading the bottles 22 in order to facilitate these operations of the drive conveyor 12.

It will be easily understood that the cranks 45 which rotate continuously effect the advance of work holder supports 11 one step or increment along the top run of the fixed guideway 16, the pin 47 engaging, in motion, the pickup groove 38 in a work holder support 11 after the work holder support 11 is freed from the fixed guideway 16 as described above. Once such a work holder support 11 is freed by a crank 45 it is then taken over by the following crank 45 in the same manner.

The work holder supports thus advance stepwise by the work stations T1, T2 ... Tn along the second segment of the closed pathway. In practice the work holder supports 11 arrive one after another upstream of the second segment, the closed pathway pushed by work holder supports freed after them from the first, drive conveyor 12. The spacing of the work holder supports 11 is then a minimum, equal to p' which in practice is equal to their width and is less than the spacing p of work holder supports 11 carried by the second, pickup conveyor. Immediately upstream of the second segment of the closed pathway and therefore of work stations T1, T2 ... Tn, the work holder supports 11 are picked up by the second, pickup conveyor 17 in accordance with the procedure described above.

Downstream of the second segment of the closed pathway and therefore of work stations T1, T2 ... Tn the work holder supports 11 are displaced along the fixed guideway 16 with a spacing p" determined by the distance between dogs 43 of the first, drive conveyor 12 which in practice is greater than the spacing p of the work holder supports 11 carried by the second, pickup conveyor 17.

Figure 13:
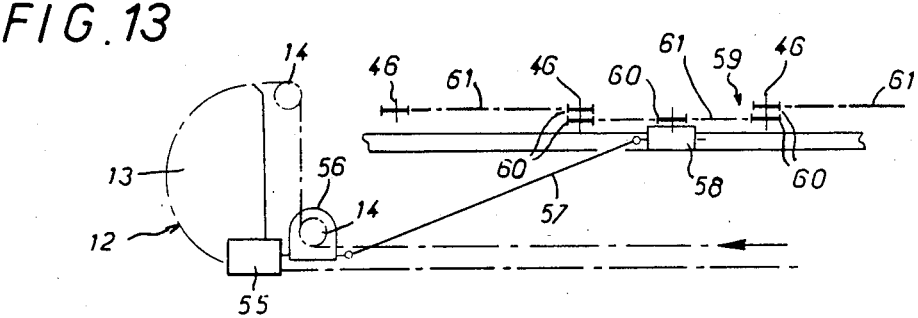
FIG. 13 is a diagrammatic elevational view of the drive means for the transfer apparatus.
Figure 14:
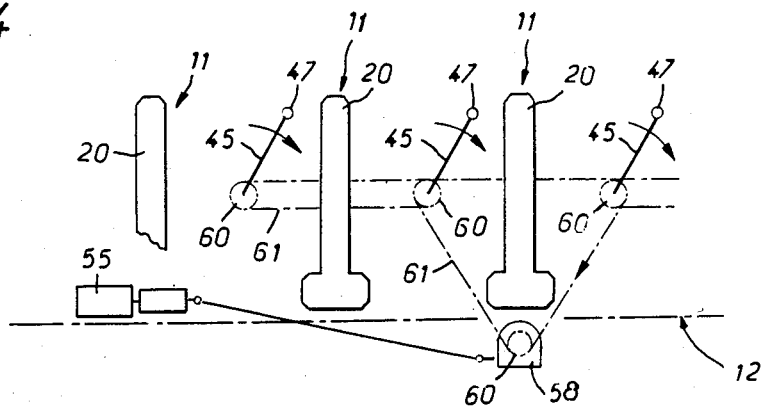
FIG. 14 is a diagrammatic plan view of the drive means represented in FIG. 13.

Although the cranks 45 rotate continuously the second, pickup conveyor 17 advances intermittently or stepwise. The first, drive conveyor 12 advances continuously. Of course, the first, drive conveyor and the second, pickup conveyor operate synchronously. For example, as diagrammatically illustrated in FIGS. 13 and 14 a single motor 55 is employed. Through reduction gear 56 the motor 55 rotates the drive sprockets of the direction change means 14 of first, drive conveyor 12. Through the reduction gear 56 a transmission shaft 57, a second reduction gear 58 and a sprocket 60 and chain 61 transmission 59 the motor 55 also drives the rotatable shafts 46 carrying cranks 45.

The present invention is not limited to the illustrated and described embodiment but on the contrary admits of all modifications and alternatives understood t those skilled in the art without departing from the scope of the appended claims.

In particular, the first, drive conveyor comprises a unitary closed-loop apparatus in the illustrated embodiment. This is not necessary the case. For example, the first, drive conveyor may comprise, on one hand, in vertical alignment with the second, pickup conveyor crank units similar to those of the second, pickup conveyor, the cranks of these crank units having pins protruding downwards instead of upwards and may even coincide with the cranks of the second, pickup conveyor, and on the other hand, disposed at the respective ends of the associated fixed guideway, two cranks which are also similar to those of the second, pickup conveyor but disposed vertically instead of horizontally, the pins of these cranks cooperating with the drive grooves in the work holder supports instead of cooperating with the pickup grooves. In this arrangement the first, drive conveyor comprises an open loop which is in effect closed by the second, pickup conveyor.

Nevertheless the work holder supports have at least two different spacings along the fixed guideway, i.e., the spacing of the work holder supports provided by the cranks of the second, pickup conveyor running by the work stations and another spacing (equal to the width of the work holder supports) which is less than the first spacing when the work holder supports are pushed together immediately upstream of the second segment of the closed pathway and therefore of the work stations.

In the above described and illustrated embodiment of the first, drive conveyor, the work holder supports have a third, different spacing which is greater than the foregoing spacings which is determined by the distance between the dogs carried by the first, drive conveyor.

What we claim is:

1. A transfer apparatus for conveying work holder supports along a closed pathway passing by at least one work station, said transfer apparatus comprising a fixed, closed, endless guideway defining said closed pathway, said work holder supports being individually mounted for movement on said fixed guideway, a first, continuous drive conveyor for transporting said work holder supports along a first segment of said closed pathway, a second, stepwise pickup conveyor taking over from said first, drive conveyor for transporting said work holder supports over a second segment of said closed pathway passing by said at least one work station, and releasable engagement means for coupling said work holder supports to said first, drive conveyor, said releasable engagement means releasing said work holder supports from said first, drive conveyor upstream of said second segment of the closed pathway and coupling said work holder supports to said first, drive conveyor downstream of the second segment of the closed pathway, said second, pickup conveyor comprising a plurality of rotatable cranks arranged in series and having projecting pins sequentially engageable with a single so-called pickup groove of each of said work holder supports provided for advancing in unison said work holder supports along said second segment of said closed pathway, and means for indexing and immobilizing said work holder supports in synchronism with said second, pickup conveyor for positively positioning and immobilizing said work holder supports after stepwise displacements of said work holder supports at said at least one work station.

2. The transfer apparatus of claim 1, wherein said work holder supports bear against upper and lower surfaces of said fixed guideway.

3. The transfer apparatus of claim 1, wherein said work holder supports have rollers bearing against upper and lower surfaces of said fixed guideway.

4. The transfer apparatus of claim 1, comprising single motor for synchronously controlling said first, drive conveyor and said second, pickup conveyor.

5. The transfer apparatus of claim 1, wherein the spacing of said work holder supports along said first segment transported by said first, drive conveyor is predetermined and different from the spacing of said work holder supports transported by said second, pickup conveyor.

6. The transfer apparatus of claim 5, wherein the spacing of work holder supports transported by said second, pickup conveyor is predetermined and closer together than the spacing of said work holder supports immediately upstream of said at least oen work station.

7. The transfer apparatus of claim 6, wherein said spacing of said work holder supports immediately upstream of said second segment of said closed pathway is a minimum spacing equal to the width of one said work holder support.

8. The transfer apparatus of claim 1, wherein said first, drive conveyor is an endless conveyor running over plural direction change means and generally lying in a vertical plane, one of said direction change means being driven, said first, drive conveyor having two sections extending generally transversely of a top run of said fixed guideway and immediately upstream and downstream of said second segment thereof, said releasable engagement means comprising a so-called drive groove in each of said work holder supports and a plurality of spaced-apart dogs protruding from said first, drive conveyor, said dogs being selectively engageable with said drive grooves in said work holder supports, each of said drive grooves extending substantially parallel to said transverse sections of said first, drive conveyor when its corresponding work holder support runs along said top run of said fixed guideway.

9. The transfer apparatus of claim 1 wherein two of said rotatable cranks are provided at said at least one work station, said two rotatable cranks being spaced from each other and rotatable synchronously.

10. The transfer apparatus of claim 9, wherein said two rotatable cranks at said at least one work station make the same angle with their respective drive shaft throughout operation.

11. The transfer apparatus of claim 1, wherein each of said work holder supports comprises a plate member having means for grasping and holding articles to be transferred, said drive groove extending substantially perpendicularly to said plate member and said pickup groove extending substantially parallel to said plate member.

12. The transfer apparatus according to claim 1, wherein said fixed guideway comprises two guide rails parallel to each other, said work holder supports extending crosswise of said guide rails, said pickup groove in each of said work holder supports extending substantially perpendicularly to both of said guide rails.

13. The transfer apparatus of claim 1, wherein adjacent portions of said first, drive conveyor and said second, pickup conveyor are spaced from each other along said closed pathway defined by said fixed guideway.

14. The transfer apparatus of claim 1, wherein adjacent portions of said first, drive conveyor and said second, pickup conveyor are at the same fixed levels.

15. The transfer apparatus of claim 1, wherein nondriven segments are provided between said first and second segments of said closed pathway, said work holder supports being adapted to push one another said nondriven segments between adjacent portions of said first and second segments of said closed pathway.

16. The transfer apparatus of claim 1, wherein releasable engagement means are provided for said work holder supports on said second pickup conveyor, said work holder supports released by one of said first, drive and second, pickup conveyors being adapted to push one another toward the other of said first, drive and second, pickup conveyors.

* * * * *